United States Patent
Anderson

(10) Patent No.: US 10,562,316 B2
(45) Date of Patent: Feb. 18, 2020

(54) PRINTING APPARATUS AND METHODS FOR DETECTING FLUID LEVELS

(71) Applicant: Hewlett-Packard Development Company, L.P., Houston, TX (US)

(72) Inventor: Daryl E. Anderson, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/069,396

(22) PCT Filed: Jan. 29, 2016

(86) PCT No.: PCT/US2016/015726
§ 371 (c)(1),
(2) Date: Jul. 11, 2018

(87) PCT Pub. No.: WO2017/131761
PCT Pub. Date: Aug. 3, 2017

(65) Prior Publication Data
US 2019/0023020 A1  Jan. 24, 2019

(51) Int. Cl.
*B41J 2/175* (2006.01)
*G01F 23/24* (2006.01)

(52) U.S. Cl.
CPC ....... *B41J 2/17566* (2013.01); *B41J 2/17546* (2013.01); *G01F 23/241* (2013.01); *B41J 2002/17579* (2013.01)

(58) Field of Classification Search
CPC ............... B41J 2/17546; B41J 2/17566; B41J 2002/17579; G01F 23/241
See application file for complete search history.

(56) References Cited

U.S. PATENT DOCUMENTS

| | | |
|---|---|---|
| 5,691,750 A | 11/1997 | Edwards |
| 5,966,144 A | 10/1999 | Edwards |
| 6,022,094 A | 2/2000 | Gibson et al. |
| 6,161,916 A | 12/2000 | Gibson et al. |
| 6,470,744 B1 | 10/2002 | Usui et al. |
| 6,536,861 B1 | 3/2003 | Usui et al. |
| 6,799,820 B1 | 10/2004 | Usui et al. |
| 7,267,000 B1 | 9/2007 | Usui et al. |
| 2002/0170353 A1 | 11/2002 | Usui et al. |
| 2003/0043216 A1 | 3/2003 | Usui et al. |
| 2003/0117450 A1 | 6/2003 | Usui et al. |

(Continued)

FOREIGN PATENT DOCUMENTS

| | | |
|---|---|---|
| EP | 2036732 | 3/2009 |
| WO | 2014084843 | 6/2014 |
| WO | 2017131761 | 8/2017 |

OTHER PUBLICATIONS

Patent Cooperation Treaty, "International Search Report," issued in connection with International Application No. PCT/US2016/015726, dated Oct. 7, 2016, 6 pages.

(Continued)

*Primary Examiner* — Lamson D Nguyen
(74) *Attorney, Agent, or Firm* — Hanley, Flight & Zimmerman LLC

(57) ABSTRACT

Printing apparatus and methods of detecting ink levels are disclosed in examples herein. An example printing cartridge includes a fluid container, a plurality of electrodes to detect fluid in the fluid container, and a shift register to capture fluid level information from the plurality of electrodes.

15 Claims, 9 Drawing Sheets

(56) References Cited

U.S. PATENT DOCUMENTS

| | | |
|---|---|---|
| 2003/0117451 A1 | 6/2003 | Usui et al. |
| 2003/0140694 A1 | 7/2003 | Usui et al. |
| 2004/0056910 A1 | 3/2004 | Usui et al. |
| 2004/0223021 A1 | 11/2004 | Farr et al. |
| 2004/0226361 A1 | 11/2004 | Usui et al. |
| 2006/0001714 A1 | 1/2006 | Usui et al. |
| 2006/0272404 A1 | 12/2006 | Usui et al. |
| 2007/0277603 A1 | 12/2007 | Usui et al. |
| 2009/0021566 A1 | 1/2009 | Usui et al. |
| 2015/0273848 A1 | 10/2015 | Ge et al. |

OTHER PUBLICATIONS

International Searching Authority, "Written Opinion of the International Searching Authority," issued in connection with International Application No. PCT/US2016/015726, dated Oct. 7, 2016, 9 pages.

PRINTING APPARATUS AND METHODS FOR DETECTING FLUID LEVELS

BACKGROUND

Inkjet printing devices include print heads having a number of nozzles. The nozzles are used to eject fluid (e.g., ink) onto a substrate to form an image. The nozzles are generally arranged in one or more columns or arrays such that a properly sequenced ejection of fluid from nozzles causes characters, symbols, and/or other graphics or images to be printed on the substrate as the print head and the substrate are moved relative to each other. Some print heads include integrated fluid level sensors to sense a level of the fluid in the print head. For example, known print heads may use electrodes to determine fluid levels by measuring the resistance of the fluid on the electrodes.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
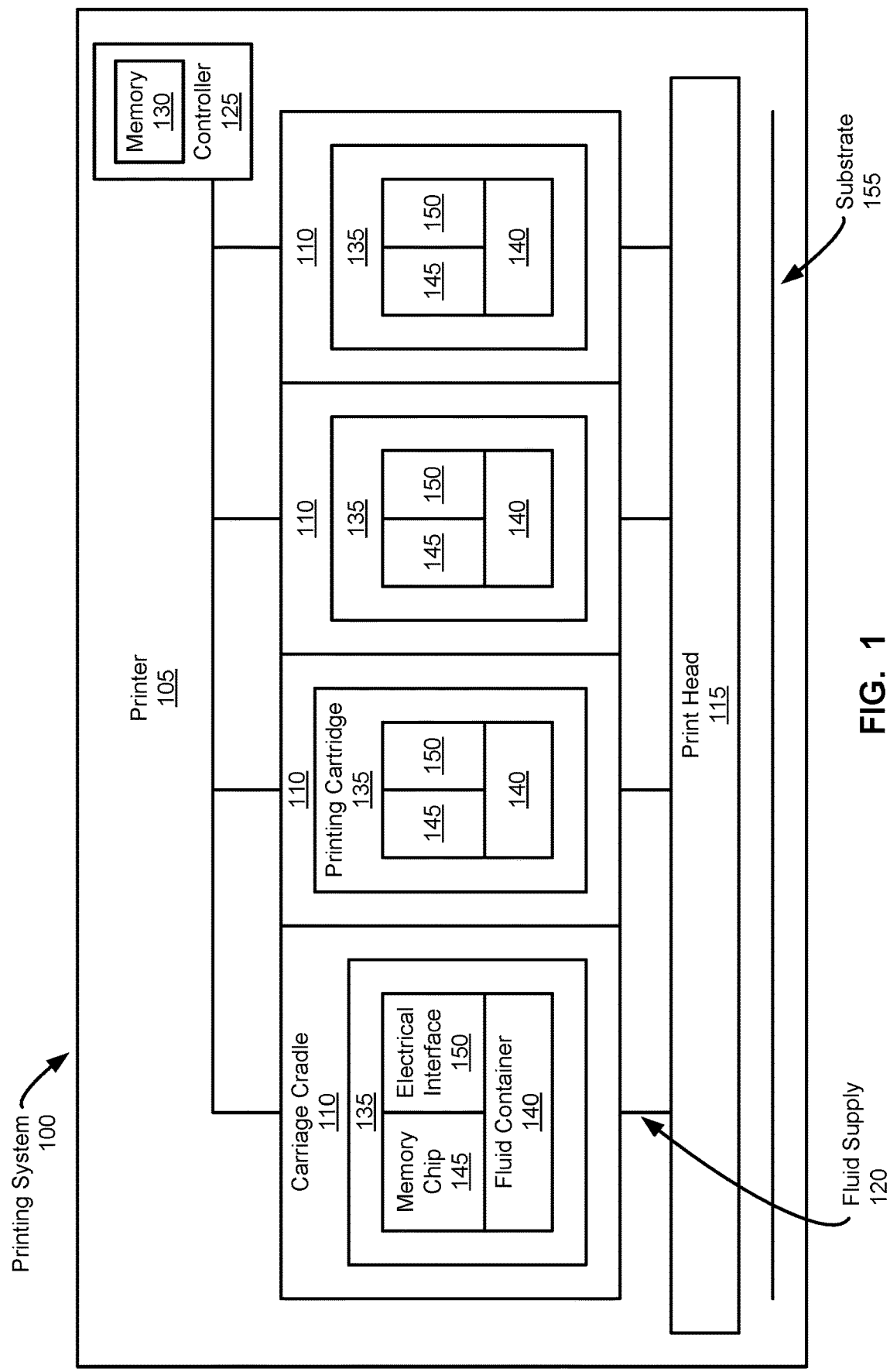
FIG. 1 illustrates a schematic view of an example fluid ejecting system that can be used to implement the examples disclosed herein.

A printing cartridge may include electrical contacts and a fluid container. In some examples, the printing cartridge interfaces with one or more print heads through a carriage cradle of a printer to facilitate printing. In some examples, the printing cartridge may include one or more print heads housed together in a replaceable device such as an integrated printing cartridge.

The fluid container may store one color of ink. Alternatively, a number of fluid containers may each store a different color of ink. In other examples, such as when used in 3D printing, the fluid container may store a fusing agent or detailing agent (e.g., water). The printing cartridge may be removed, replaced, and/or refilled. Electrical contacts carry electrical signals to and from a controller, for example, to control fluid drop generators in the print heads to eject fluid drops through nozzles and to make fluid level measurements. Some known printing cartridges utilize a silicon die as a sensing device to make fluid level measurements. However, silicon is expensive.

The controller may control the print heads for ejection of fluid drops from nozzles, for example, by defining a pattern of ejected fluid drops that form characters, symbols, and/or other graphics or images on a print media. The pattern of ejected fluid drops may be determined by print job commands and/or command parameters from a data source.

In some example implementations of the present subject matter, the printing cartridge includes an electrical interface (e.g., a printer application specific integrated circuit (ASIC)) to determine the level of fluid in the fluid container based on values from a shift register integrated on a sensing die/substrate.

The level of fluid available in the fluid container may be determined for a number of reasons, for example, to determine an appropriate time for replacement of the cartridge and to avoid premature replacement of the cartridge. In some example implementations of the present subject matter, the shift register comprises a series of sensing flops (e.g., flip-flops) coupled to electrodes embedded in the sensing die/substrate. The values stored by the sensing flops vary based on the contents of the fluid container. The contents of the fluid container may be all ink (e.g., a filled ink container), ink and air (e.g., a partially-filled ink container), just air (e.g., an empty ink container), or an agent (e.g., a 3D printing agent). Thus, the value of each of the sensing flops changes with the level of fluid in the fluid container and provides an indication of the level of fluid in the fluid container.

The sensing die/substrate utilizes a shift register to capture and communicate a fluid level measurement within the fluid container. The shift register captures fluid level values upon power-up and then the fluid level values are "shifted off" the sensing die to the electrical interface. As a result, the shift register utilizes a relatively small die area and few interconnections. For example, an example implementation of the shift register may include two supply lines, a clock and a shift out (e.g., a sensing) line. However, other implementations eliminating the clock, the shift out line or both, are also possible.

When a printer fluid level request is received at the shift register (e.g., from the electrical interface), each of the electrodes detects whether it is in contact with fluid in the fluid container and the sensing flops associated with the respective electrodes store a value based on whether fluid was detected. Once the sensing flops are stabilized (e.g., after a setup period), the values stored by the shift register (e.g., the fluid level values stored by the plurality of sensing flops) are "shifted out" to the electrical interface, which translates the shift register value (e.g., the fluid level values) into a fluid level measurement (e.g., 30% filled). The granularity of the fluid level measurement depends on the number of sensing flops included in the shift register.

The present subject matter describes fluid level sensing apparatus and methods including a shift register. The fluid level sensing apparatus and methods of the present subject matter reduce the size of fluid level sensing apparatus integrated with a fluid container, thereby saving cost and providing a simple communication protocol that reduces silicon area and cost.

In accordance with an example implementation of the present subject matter, the electrical interface acquires fluid level information via a shift register embedded in the sensing die. When the shift register is powered-on, fluid level information is latched into the shift register. The latched fluid level information is shifted out on a line (e.g., a shift_out line or a sensing line) to the electrical interface. A clock signal is provided by the electrical interface to the shift register to shift out the fluid level information.

The circuitry on the shift register facilitates as many sensing flops as fluid levels to be detected. For example, the shift register may include 100 sensing flops to provide fluid level measurements in one percent increments, include 20 sensing flops to provide fluid level measurements in five percent increments, etc. Each sensing flop has an electrode that connects a memory element of the sensing flop to a position in the fluid container such that the electrode contacts fluid in the fluid container if the fluid level is at or above the height of the electrode relative to the fluid container.

When the shift register powers-up (e.g., via a voltage supply line provided by the electrical interface), each of the sensing flops stores a value indicative of whether fluid was detected at the electrode. In accordance with an example implementation of the present subject matter, the sensing flops are designed so that they store a logical "0" value when the electrode is in contact with fluid in the fluid container and store a logical "1" value when the electrode is not in contact with fluid. In other example implementations, the sensing flops may be designed so that they store a logical "1" value when the electrode is in contact with fluid in the fluid container and store a logical "0" value when the electrode is not in contact with fluid.

In accordance with an example implementation of the present subject matter, the fluid level sensing apparatus and methods implement a setup period once the shift register powers-up to ensure that the fluid level values stored in the sensing flops are stable. The setup period may be determined via empirical testing or simulations. When the setup period expires, the shift register "shifts out" the fluid level values to the electrical interface for translating. For example, the electrical interface may map a count of logical "1" values to a fluid level measurement (e.g., a percentage filled). In accordance with an example implementation of the present subject matter, the fluid level sensing apparatus powers-down the shift register once the fluid level measurement is determined.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Figure 2:
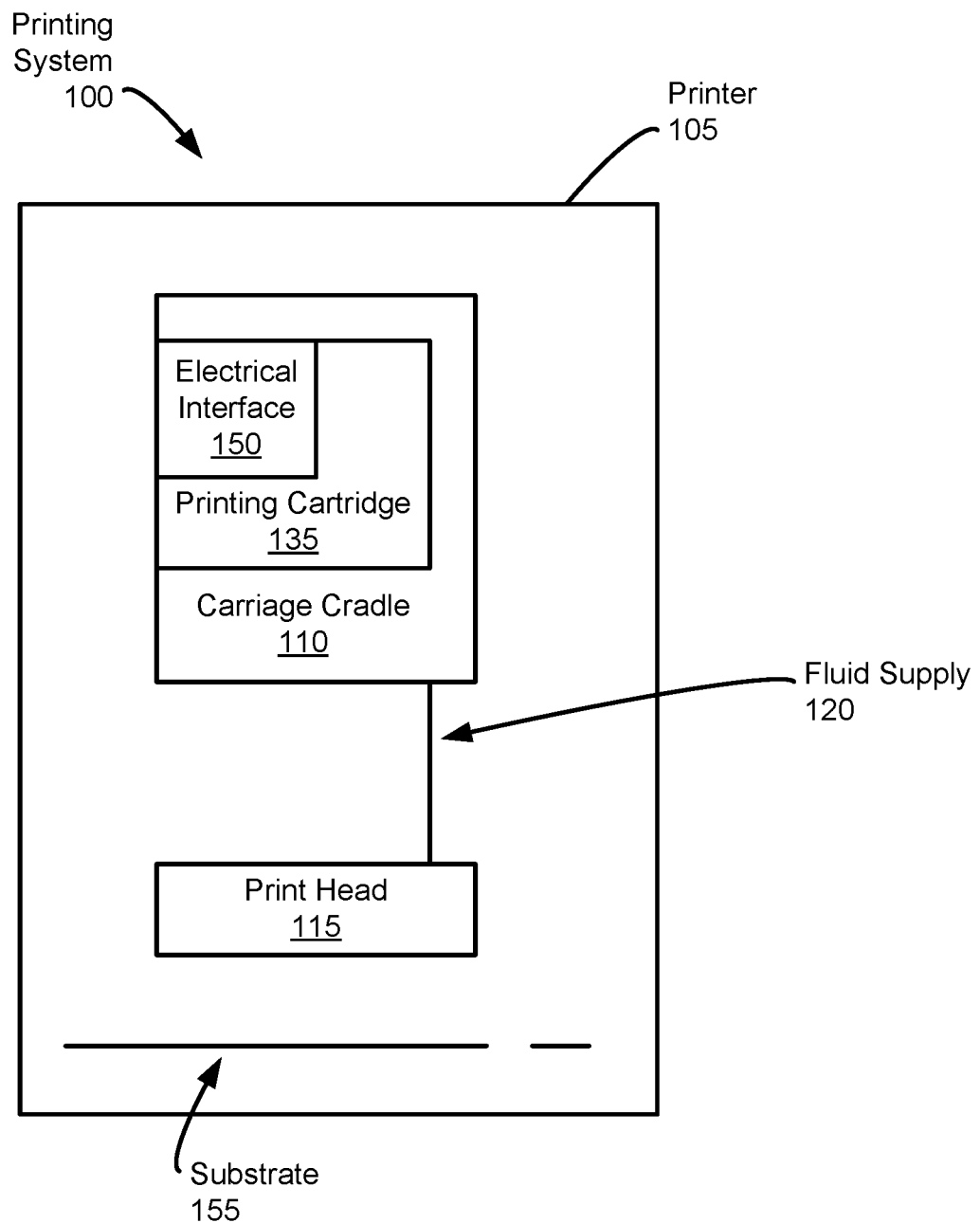
FIG. 2 illustrates another schematic view of the example fluid ejecting system of FIG. 1.

FIG. 1 is a block diagram of an example printing system 100 that can be used to implement the teachings of this disclosure. FIG. 2 is a side view of the example printing system 100 of FIG. 1. The example printing system 100 of FIGS. 1 and/or 2 includes an example printer 105, example carriage cradles 110 and example printing cartridges 135. In an example implementation, the printer 105 is an inkjet printer (e.g., a thermal inkjet printer, a piezo inkjet printer, a continuous inkjet printer, etc.). In some examples, the printer 105 is a 3D printer used to "print" three-dimensional objects.

The example printer 105 of FIGS. 1 and/or 2 includes one or more carriage cradles 110 to receive and exchange one or more corresponding printing cartridges 135. The carriage cradles 110 are arranged to establish a fluidic interface between the printing cartridges 135 and a print head 115 via a fluid supply 120. In an example implementation, the print head 115 is a page-wide array print head. However, other types of print heads, such as a scanning print head, may additionally or alternately be used. During a print operation, a substrate 155 (e.g., paper) extends under the print head 115. In some examples, the printer 105 may move the carriage cradle 110 over the substrate 155.

In an example implementation, the printer 105 is provided with a controller 125 including a memory 130. The controller 125 may retrieve and execute executable code from the memory 130. For example, the controller 125 may execute executable code to cause a power supply unit to provide power to the example print head 115. The memory 130 may include a variety of information such as an identifier of the printer 105, an identifier of printing cartridges 135 that may be used with the printer 105, calibration data, error information, etc.

The example printing cartridges 135 of FIGS. 1 and/or 2 include a fluid container 140, a memory chip 145 and an electrical interface 150. The carriage cradles 110 are arranged to connect the fluid containers 140 to the print head 115 through the fluid supply 120. In an example implementation, each printing cartridge 135 may include a different fluid in the respective fluid containers 140. For example, if the printer 105 is an inkjet printer, the fluid in each fluid container 140 may include ink of a specific color (e.g., a cyan color, a magenta color, a yellow color, a black color and/or gray color, etc.). In another example, if the printer 105 is a 3D printer, the fluid in each fluid container 140 may be an agent such as a fusing agent or a detailing agent (e.g., water). The printing cartridges 135 of FIGS. 1 and/or 2 are arranged to be exchanged with respect to the corresponding carriage cradle 110.

The memory chip 145 of the printing cartridges 135 may include a variety of information such as an identifier of the type of printing cartridge, an identification of the kind of fluid contained in the fluid container 140, calibration data, error information and/or other data. In some examples, the memory chip 145 includes information indicating when the respective printing cartridge 135 should receive maintenance. In some examples, the printer 105 can take appropriate action based on the information contained in the memory chip 145, such as altering printing routines to maintain image quality.

In an example implementation, the controller 125 may retrieve data from the electrical interface 150. For example, the controller 125 may request the electrical interface 150 provide cartridge characteristics such as product characteristics, fluid quantity characteristics, fluid type characteristics, etc.

In some examples, the printing cartridges 135 may include an integrated print head. For example, the print head 115, the fluid supply 120 and the fluid container 140 may be housed together in a replaceable device such as an integrated printing cartridge.

Figure 3:
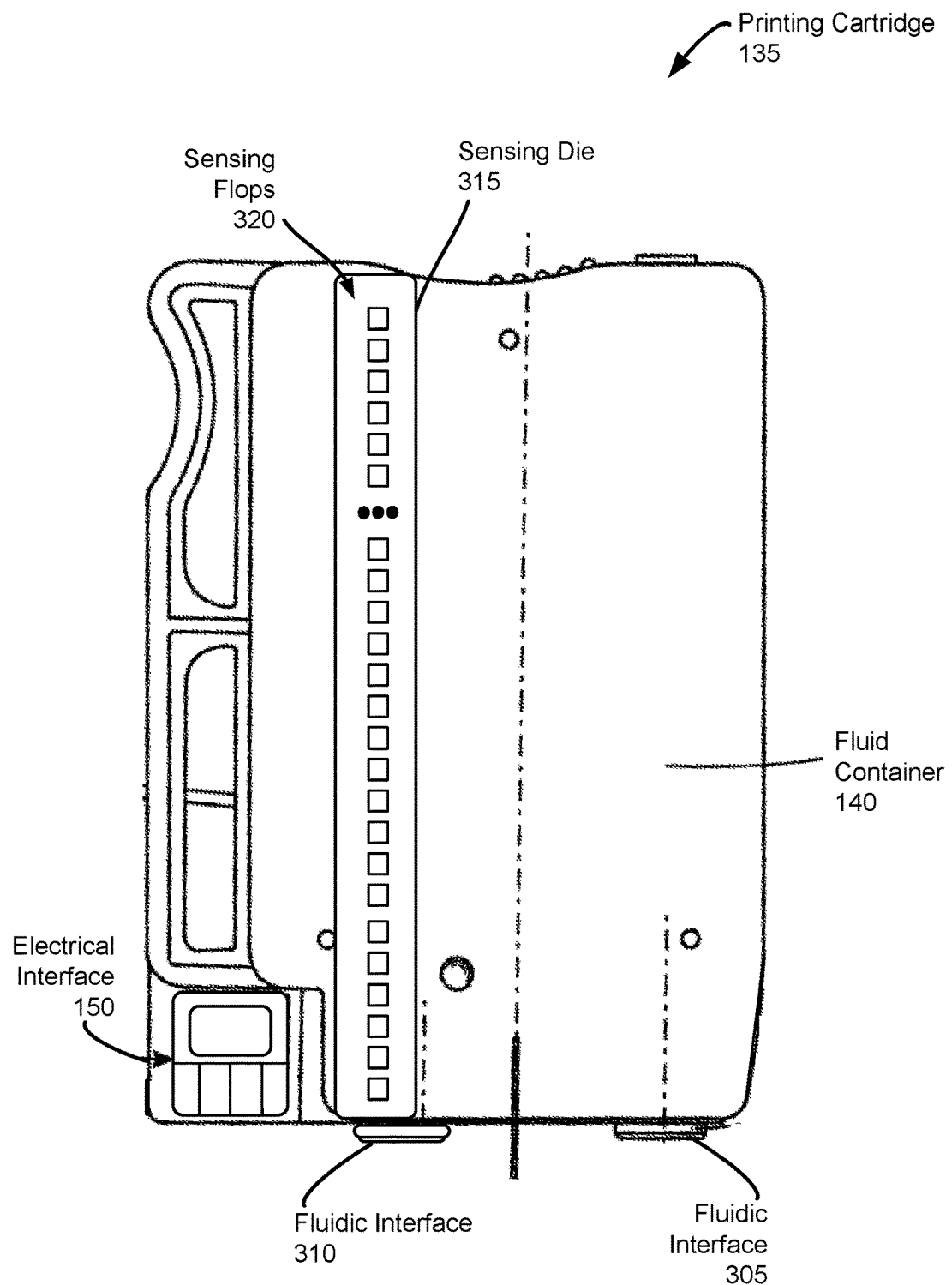
FIG. 3 illustrates a schematic view of a fluid cartridge that can be used with the example fluid ejecting system of FIG. 1 to implement the examples disclosed herein.

FIG. 3 is a block diagram of an example printing cartridge 135 that can be used with the example printing apparatus 100 of FIGS. 1 and/or 2. In this example, the printing cartridge 135 includes the example fluid container 140, the example electrical interface 150, example fluidic interfaces 305, 310 and an example sensing die 315 including a plurality of sensing flops 320.

The example fluidic interfaces 305, 310 establish a fluidic connection with the printer 105. For example, the first fluidic interface 305 may be a seal ring (e.g., a socket) to receive a fluid pen extending from the carriage cradle 110. In an example implementation, the first fluidic interface 305 may guide a print fluid, such as ink, from the fluid container 140 to the carriage cradle 110. During a print operation, the printing system 100 prints by retrieving the first fluid (e.g., a print fluid) from the ink container 140 via the first fluidic interface 305.

The second fluidic interface 310 may facilitate transporting a gas, such as air, to and from the fluid container 140, for example, to implement pressure control inside the fluid container 140. The gas may be ambient air. In an example implementation, the second fluid interface 310 may be connected to a pressure bag located within the fluid container 140.

To make fluid level measurements, the printing cartridge 135 includes the example sensing die 315. In the illustrated example, the sensing die 315 is made of silicon and is in contact with the fluid container 140 from the top to the bottom. The example sensing die 315 includes a plurality of sensing flops 320 to capture fluid levels within the fluid container 140 and to communicate the fluid levels. The example sensing flops 320 capture fluid level information upon power-up of the sensing die 315. For example, each of the sensing flops 320 may store a logical "1" value when fluid is not detected and may store a logical "0" value when fluid is detected in the fluid container 140. The sensing flops 320 then transmit (e.g., "shift out") the fluid level information to the electrical interface 150, which may then provide the fluid level information to the controller 125. In some examples, the electrical interface 150 may process the fluid level information prior to transmitting the information to the controller 125. For example, the electrical interface 150 may generate a signal based on the fluid level information provided by the sensing flops 320. The electrical interface 150 may communicate the signal to the controller 125 via an electrical connection established with the printer 105 through the carriage cradle 110.

The number of sensing flops 320 included in the sensing die 315 varies based on the desired granularity of the fluid level measurements. For example, 100 sensing flops 320 may be positioned in the sensing die 315 so that each sensing flop 320 corresponds to one percent fluid-filled increments. However, other implementations may use any other number of sensing flops 320.

In some implementations, the sensing die 315 may be encapsulated in an insulator and mounted vertically on the printing cartridge 135. In some such instances, the sensing die 315 may include exposed areas that are in contact with fluid in the fluid container 140, but not insulated. Each of the sensing flops 320 may be in electrical contact with the fluid container 140 via respective exposed areas. For example, when an exposed area is in contact with fluid in the fluid container 140, a corresponding sensing flop 320 may store a logical "0" value and when the exposed area is not in contact with fluid, the corresponding sensing flop 320 may store a logical "1" value.

Figure 4:
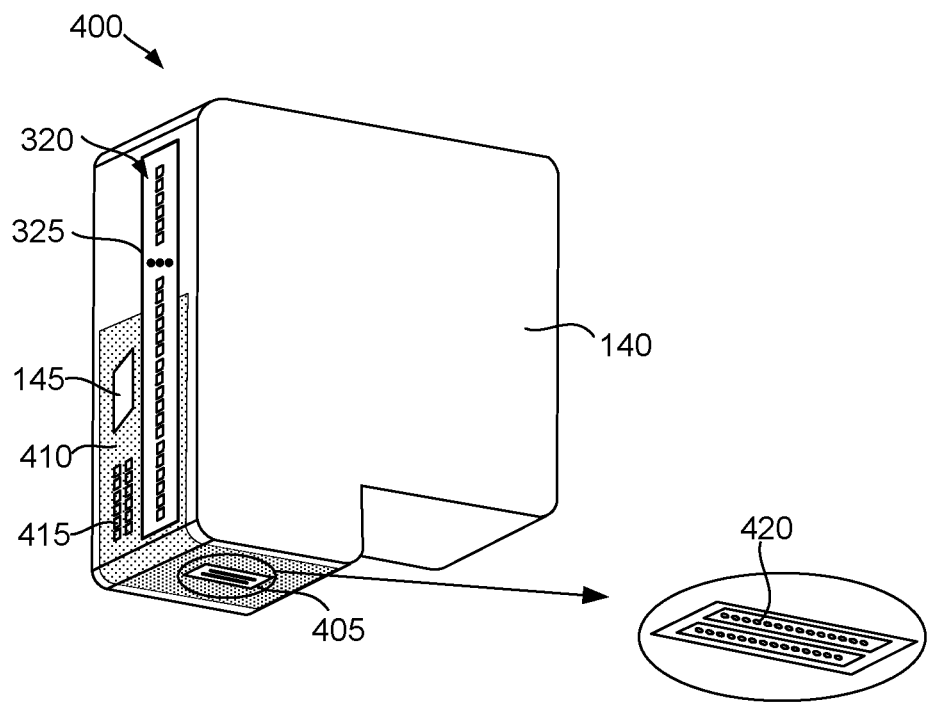
FIG. 4 illustrates a schematic view of another fluid cartridge that can be used to implement the examples disclosed herein.

FIG. 4 is a block diagram of an alternate example printing cartridge 400 that can be used with the example printing system 100 of FIGS. 1 and/or 2. In this example, the printing cartridge 400 is an integrated printing cartridge including the fluid container 140 and an example print head 405. The example printing cartridge 400 also includes an example flexible cable 410, example conductive pads 415, example nozzles 420, the example memory chip 145 and the example sensing die 315 of FIG. 3 including a plurality of sensing flops 320. The example flexible cable 410 is coupled to the sides of the printing cartridge 400 and includes traces that couple the example memory chip 145, the example print head 405, the example conductive pads 415 and the example sensing die 315.

In operation, the example printing cartridge 400 may be installed in the carriage cradle 110 of, for example, the example printer 105 of FIGS. 1 and/or 2. When the example printing cartridge 400 is installed within the carriage cradle 110, the example conductive pads 415 are pressed against corresponding electrical contacts in the carriage cradle 110 to enable the example printer 105 to communicate with and/or control the electrical functions of the printing cartridge 400. For example, the example conductive pads 415 enable the printer 105 to access and/or write to the example memory chip 145.

The memory chip 145 of the illustrated example may include a variety of information such as an identifier of the type of printing cartridge, an identification of the kind of fluid contained in the fluid container, calibration data, error information and/or other data. In some examples, the memory chip 145 includes information indicating when the printing cartridge 400 should receive maintenance. In some examples, the printer 105 can take appropriate action based on the information contained in the memory chip 145, such as altering printing routines to maintain image quality.

To print an image on the substrate 155 (e.g., paper), the example printer 105 moves the carriage cradle 110 containing the printing cartridge 400 over the substrate 155. To cause an image to be printed on the substrate 155, the example printer 105 sends electrical signals to the printing cartridge 400 via electrical contacts in the carriage cradle 110. The electrical signals pass through the conductive pads 415 of the printing cartridge 400 and are routed through the flexible cable 410 to the print head 405 to energize individual heating elements (e.g., resistors) within the die print head. The electrical signal passes through one of the heating elements to create a rapidly expanding vapor bubble of fluid that forces a small droplet of fluid out of a firing chamber within the print head 405 and through the corresponding nozzle 420 onto the surface of the substrate 155 to form an image on the surface of the substrate 155.

To make fluid level measurements, the printing cartridge 400 includes the example sensing die 315. The example sensing die 315 includes the plurality of sensing flops 320 to capture fluid levels within the fluid container 140 and to communicate the fluid levels. The example sensing flops 320 capture fluid level information upon power-up of the sensing die 315. For example, each of the sensing flops 320 may store a logical "1" value when fluid is not detected and may store a logical "0" value when fluid is detected in the fluid container 140. The sensing flops 320 then transmit (e.g., "shift out") the fluid level information to the controller 125 via the flexible cable 410.

Figure 5:
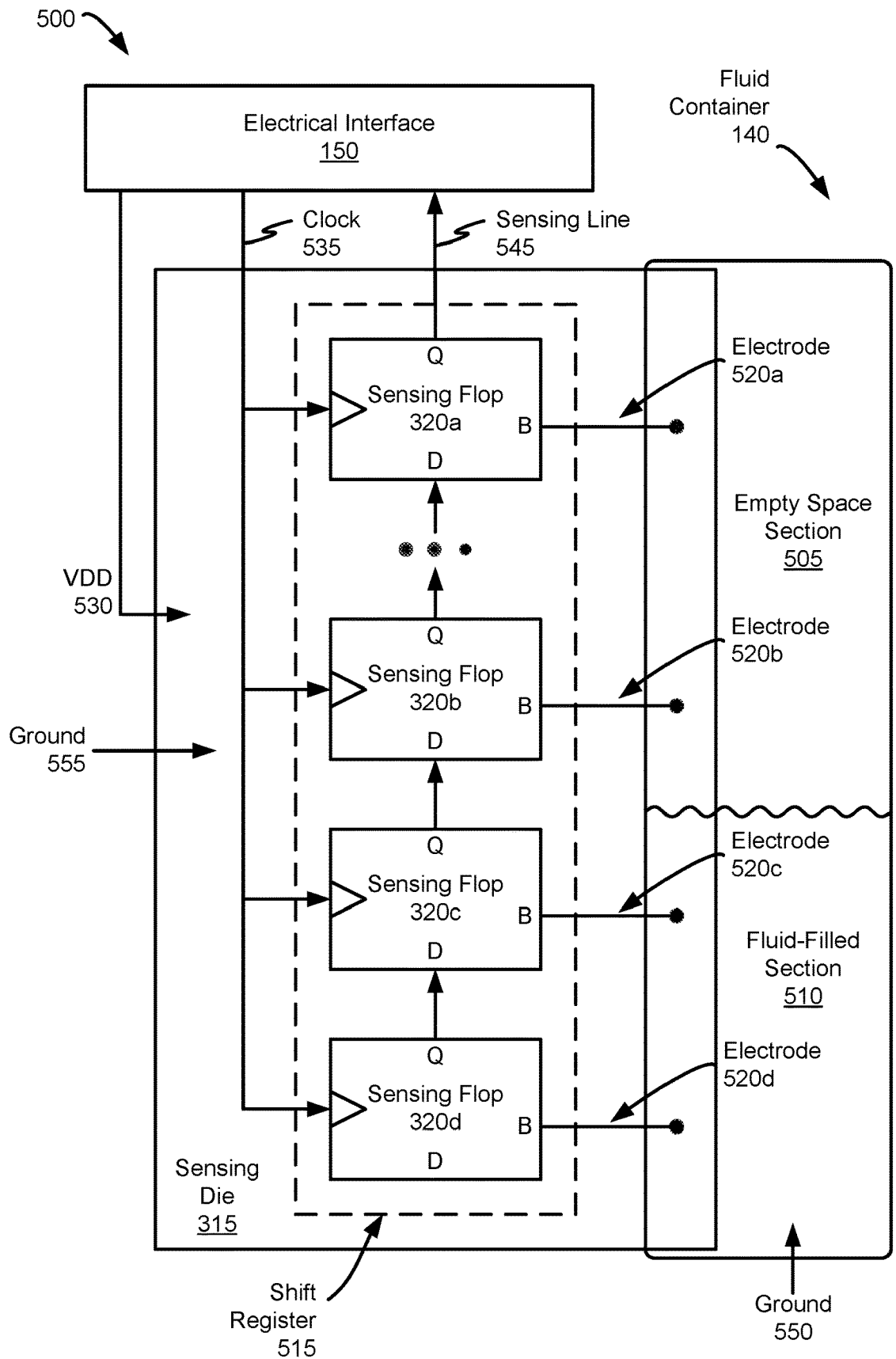
FIG. 5 illustrates a schematic view of a sensing die with a shift register in communication with an electrical interface, according to an example implementation of the present subject matter.

FIG. 5 is a block diagram of an example implementation of the sensing die 315 of FIGS. 3 and/or 4, according to an example implementation of the present subject matter. In an example implementation, the sensing die 315 is in contact with the fluid container 140 and in communication with the electrical interface 150. In the illustrated example, the fluid container 140 includes an empty space section 505 and an example fluid-filled section 510. A reservoir ground 550 is provided to the fluid container 140.

The example sensing die 315 includes four sensing flops 320a, 320b, 320c, 320d. The sensing flops, collectively referred to as sensing flops 320, implement an example shift register 515 (e.g., a serial-in and serial-out shift register). For example, the output of each sensing flop 320 is connected to the input of the next sensing flop 320 in the series. The sensing flops 320 are electrically connected to the fluid container 140 via corresponding electrodes 520a, 520b, 520c, 520d. The electrodes, collectively referred to as electrodes 520, may be metallic pins, traces of metal, wires, etc. The electrodes 520 complete an electrical circuit when fluid in the fluid container 140 is detected. The sensing die 315 is also provided a common ground 555.

The sensing flops 320 store a value representative of whether fluid is detected or not detected by the corresponding electrodes 520. In the illustrated example, a sensing flop 320 stores a logical "0" value when the corresponding electrode 520 is in contact with fluid in the fluid container 140 because the sensing flop 320 is connected to ground 550 via the fluid. The sensing flop 320 of the illustrated example of FIG. 5 stores a logical "1" value when the corresponding electrode 520 is not in contact with fluid in the fluid container 140 because there is a resistor that is grounded by the fluid.

In the illustrated implementation, the sensing die 315 replies to queries from the electrical interface 150 (e.g., requests to sense fluid levels). The example electrical interface 150 provides power to the sensing die 315 and/or the shift register 515 and processes the fluid level information transmitted by the shift register 515. The electrical interface 150 is in electrical communication with the sensing die 315. In the illustrated example, the electrical interface 150 provides a voltage supply line 530 to the sensing die 315. The example electrical interface 150 provides power to the sensing die 315 when requesting a fluid level measurement and disables power to the sensing die 315 when the fluid level measurement is received. In an example implementation, each sensing flop 320 stores a value indicative of whether fluid is detected by the corresponding electrode 520 when voltage is provided to the sensing die 315 via the voltage supply line 530.

The sensing flops 320 are connected to a clock 535 controlled by the electrical interface 150. The clock 535 is utilized by the electrical interface 150 to "shift out" fluid level information stored by the sensing flops 320 via an example sensing line 545. In an example implementation, the sensing flops 320 "shift out" fluid level information in serial and based on the clock 535. For example, during a first rising-edge clock signal, the sensing flop 320c shifts its stored value (e.g., a value representative of whether the corresponding electrode 520c detected fluid) to the sensing flop 320b via the output q-line. The sensing flop 320c also stores a fluid level value received from the sensing flop 320d via the input d-line. At the next rising-edge clock signal, the sensing flop 320c shifts the value received from the sensing flop 320d to the sensing flop 320b and stores the next fluid level value received from the sensing flop 320d (if any). In an example implementation, the shift out continues until all values stored in the sensing flops 320 are communicated to the electrical interface 150.

In some implementations, the sensing die 315 may generate the clock signal 535. For example, the sensing die 315 may include a ring oscillator. In some such examples, the sensing die 315 may include circuitry (e.g., flip flops) to initiate a "start" sequence and eliminate the clock signal 535 from the electrical interface 150.

In some implementations, the sensing flops 320 may transmit the fluid level information via the voltage supply line 530. In some such examples, the electrical interface 150 may sense a change (e.g., a reduced voltage) in the voltage carried over the voltage supply line 530 to determine when the sensing flops 320 are transmitting information. For example, the sensing flops 320 may transmit a logical "1" value by pulling the voltage carried over the voltage supply line 530 by a percentage (e.g., five percent). In some such implementations, the voltage supply line 530 may be a dedicated line with relatively high impedance. By transmitting the fluid level information via the voltage supply line 530, the sensing die 315 may eliminate the sensing line 545.

In operation, the electrical interface 150 initiates fluid level measurement by providing power to the sensing die 315 via the voltage supply line 530. The electrical interface 150 may initiate fluid level measurement in response to a command from a user (e.g., via a fluid level measurement control on the printer 105, via a fluid level measurement control in a graphical interface, etc.), in response to a page count (e.g., after every one page printed, after every ten pages printed, etc.), etc. During power-up, the electrodes 520 detect whether fluid is present (e.g., in contact with the electrode 520). The fluid level values are stored in the corresponding sensing flops 320.

Figure 6:
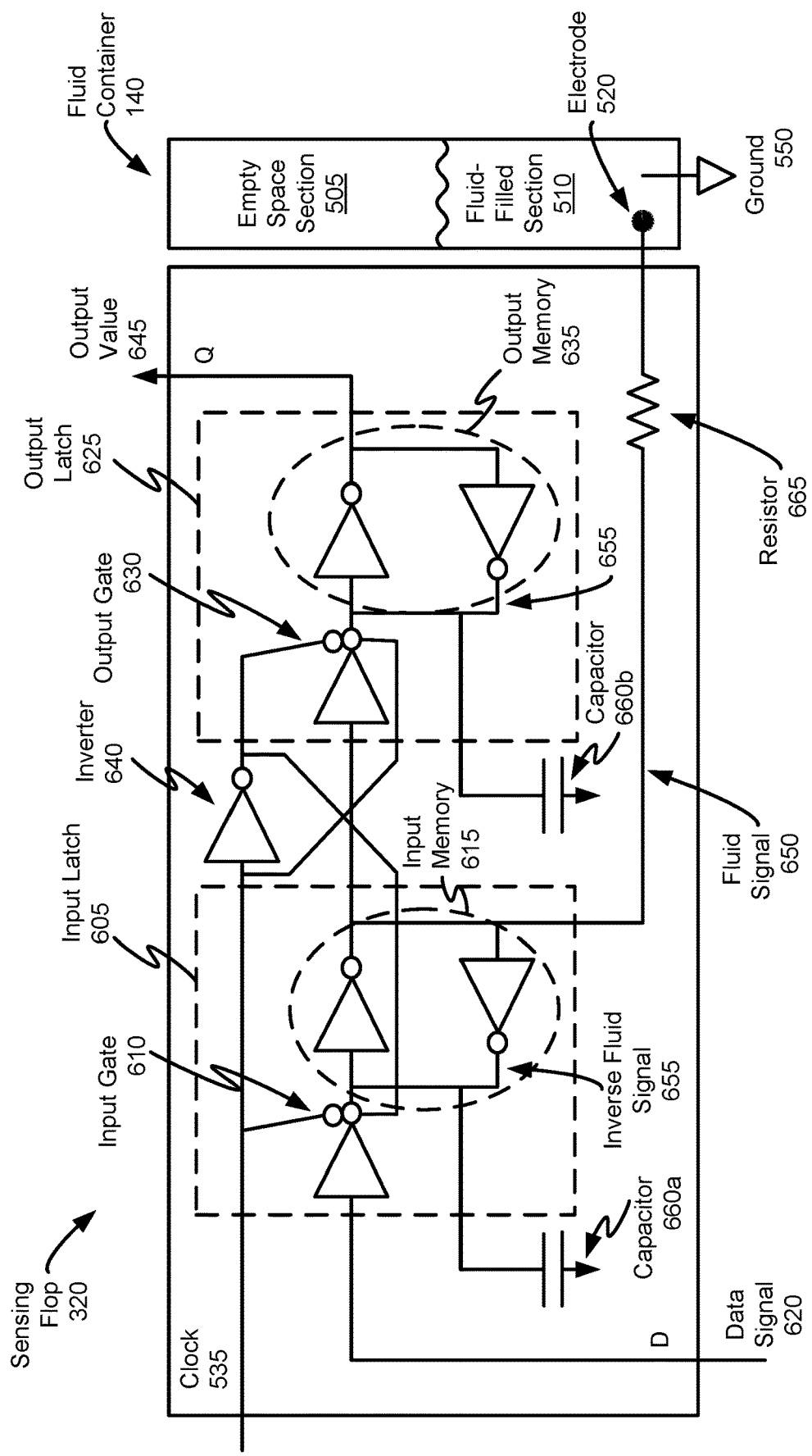
FIG. 6 illustrates electrical connections in a sensing flop of the sensing die, according to an example implementation of the present subject matter.

As disclosed in connection with FIG. 6, the sensing flops 320 operate so that when an electrode 520 is not in contact with fluid in the fluid container 140, a fluid signal provided by the electrode 520 is biased (e.g., influenced, pulled, etc.) to cause the corresponding sensing flop 320 to store a logical "1" value (e.g., a high value). When an electrode 520 is in contact with fluid in the fluid container 140, an electrical circuit is complete. However, the reservoir ground 550 provided to the fluid container 140 biases an inverse fluid signal to rise relatively slow, which causes the corresponding sensing flop 320 to store a logical "0" value (e.g., a low value).

After a setup period, during which the fluid level values stored by the sensing flops 320 are stabilized, the electrical interface 150 transmits a clock signal 535 to the shift register 515 to cause the shift register 515 to transmit the fluid level values. The shift register 515 "shifts out" the fluid level values to the electrical interface 150 via the sensing line 545. The sensing flops 320 corresponding to electrodes 520 in contact with fluid "shift out" a logical "0" value and the sensing flops 320 corresponding to electrodes 520 not in contact with fluid "shift out" a logical "1" value. The setup period may be a preset time period based on empirical or simulated testing. Additionally or alternatively, the setup period may be selected as a time period long enough to allow the sensing flops 320 to stabilize fluid level values. For example, implementing a one microsecond setup period after providing power to the sensing die 315 may allow the sensing flops 320 to stabilize. In the illustrated example, the electrical interface 150 transmits a periodic clock signal 535 to enable all of the sensing flops 320 to "shift out" their fluid level values.

In an example implementation, the electrical interface 150 maps (e.g., translates, interprets, etc.) the fluid level values to make a fluid level measurement for the fluid container 140. In some examples, the electrical interface 150 may count the number of logical "0" values before a logical "1" value is received and associate the count with a fluid level measurement. For example, assuming a sensing die 315 includes 100 sensing flops 320 and the electrical interface 150 counts 75 logical "1" values before a logical "0" value, the electrical interface 150 may determine the fluid container 140 is 25 percent full. Additionally or alternatively, the electrical interface 150 may count the number of logical "0" values to determine a fluid level measurement.

In some examples, the electrical interface 150 may include a false-positive test to reduce the number of inaccurate measurements. For example, fluid may be in contact with the electrode 520a in the empty space section 505 of the fluid container 140. In such instances, to prevent incorrectly interpreting the fluid level, the electrical interface 150 may monitor the number of logical "1" values before and/or after a logical "0" value is detected. If, for example, a threshold number of logical "1" values are counted before and/or or after a logical "0" value, the electrical interface 150 may determine the logical "0" value is a false-positive and count the value as a logical "1" value (e.g., fluid not detected at the corresponding position in the fluid container 140). However, other techniques of interpreting fluid level information captured by the shift register 515 may additionally or alternatively be used.

In the illustrated implementation, the sensing die 315 responds to requests for fluid level measurements from the electrical interface 150. In some examples, the sensing die 315 may additionally or alternatively respond to requests for fluid level measurements from the controller 125. For example, if a printing cartridge does not include an electrical interface, the sensing die 315 may receive requests to sense fluid levels from the controller 125.

FIG. 6 illustrates electrical connections in a sensing flop 320, according to an example implementation of the present subject matter. The example sensing flop 320 includes clock signal 535 controlled by the electrical interface 150. The clock signal 535 is electrically connected to an input latch 605 and an output latch 625. The electrode 520 is in circuit with the input latch 605 via an input signal 650 and a register 665.

The input latch 605 includes an input gate 610 (e.g., a tristate driver) and an input memory 615. When the clock signal 535 is a high value (e.g., 2 volts), the input gate 610 is connected and the input memory 615 is provided a value by data signal 620. The data signal 620 represents an output value 645 "shifted out" by a previous sensing flop 320 in the series of sensing flops 320 of the shift register 515. When the clock signal 535 is a low value (e.g., 0 volts), the input gate 610 is disconnected and the input memory 615 stores (e.g., latches) the value provided by the data signal 620.

The output latch 625 includes an output gate 630 and an output memory 635. The clock signal 535 is connected to the output latch 625 via an inverter 640. When the clock signal 535 is a low value (e.g., 0 volts), the output gate 630 is connected and the output memory 635 is provided a value output by the input memory 615. When the clock signal 535 is a high value (e.g., 2 volts), the output gate 630 is disconnected and the output memory 635 stores (e.g., latches) the value provided by the input memory 615. During a "shift out" process, output value 645 represents the value stored in the output memory 635 and is the value "shifted out" to the next sensing flop 320 in the series of sensing flops 320 via the data signal line 620 or to the electrical interface 150 via the sensing line 545.

In the illustrated example, the input gate 610 and the output gate 630 are implemented by a tristate driver. However, other techniques for implementing a switch may additionally or alternatively be used. In the illustrated example, the input memory 615 and the output memory 635 are implemented by two inverters. However, other implementations of a memory (e.g., a memory element) may additionally or alternatively be used.

When the sensing die 315 is in a power off state (e.g., the voltage from the electrical interface 150 to the sensing die 315 via the voltage supply line 530 is zero), the voltages and current across the sensing flop 320 are also set to zero. When the sensing die 315 is powered-on (e.g., to make a fluid level measurement), the output memory 635 stores a fluid level value based on whether the electrode 520 detected fluid in the fluid container 140. However, when the sensing die 315 is initially powered-on (e.g., receives power via the voltage supply line 530), a situation may arise where the value stored in the input memory 615 and/or the output memory 635 is unknown. For example, fluid signal 650 and inverse fluid signal 655 could both be a high value (e.g., 2 volts), both be a low value (e.g., 0 volts), or could be between (e.g., at 50 percent) a high value and a low value.

To reduce the likelihood of an unknown value, the sensing flop 320 includes circuitry to bias (e.g., weigh or influence) the fluid signal 650 and/or the inverse fluid signal 655. As discussed above, when the fluid container 140 includes fluid, the electrode 520 completes an electrical circuit. In an example implementation, the fluid container 140 includes the reservoir ground 550. When the electrical circuit is complete (e.g., when the electrode 520 is positioned in the fluid-filled section 510 of the fluid container 140), the reservoir ground 550 pulls (e.g., biases) the fluid signal 650 towards a low value. As a result, the relatively low fluid voltage signal 650 causes the memories 615, 635 to store a logical "0" value when the electrode 520 detects fluid in the fluid container 140.

To stabilize the fluid level value stored in the memories 615, 635 when the electrode 520 is not in contact with fluid in the fluid container 140 (e.g., the electrode 520 is positioned in the empty space section 505 of the fluid container 140), the inverse fluid signal 655 is biased (e.g., influenced) by capacitors 660a, 660b. For example, the capacitor 660a may pull (e.g., bias) the inverse fluid signal 655 towards a low value. As a result, the relatively low voltage inverse fluid signal 655 causes the memories 615, 635 to store a logical "1" value when the electrode 520 does not detect fluid in the fluid container 140.

The size of the inverter 640, the inverters of the memories 615, 635 and the capacitors 660a, 660b are selected to balance the bias of the fluid signal 650 and the inverse fluid signal 655. For example, the size of the capacitors 660a, 660b may be selected so as not to offset the bias provided to the fluid signal 650 by the reservoir ground 550 when fluid is detected in the fluid container 140.

In operation, when the sensing die 315 is in a powered-off state, the voltages across the sensing flop 320 are set to zero. When a voltage is provided to the sensing die 315 (e.g., by the voltage supply line 530), the memories 615, 635 latch a fluid level value representative of whether the electrode 520 is in contact with fluid in the fluid container 140. In an example implementation, the memories 615, 635 store a logical "1" value when the electrode 520 is not in contact with fluid and the memories 615, 635 store a logical "0" value when the electrode 520 is in contact with fluid in the fluid container 140.

After a setup period to allow the fluid level values in the memories 615, 635 to stabilize, the electrical interface 150 sends a shift signal via the clock 535 to "shift out" the fluid level values. For example, the sensing flops 320 of the shift register 515 may sequentially "shift out" the fluid level values on the sensing line 545 in response to a rising-edge clock signal. The duration and number of rising-edge clock signals may depend on the number of sensing flops 320 included in the shift register 515. For example, if the shift register 515 includes fifty sensing flops 260, fifty clock cycles are provided to "shift out" the fluid level values. In an example implementation, when the "shift out" process is complete, the electrical interface 150 powers-off the sensing die 315 by transitioning the voltage supply line 530 to a low value (e.g., 0 volts) and the voltages across the sensing flops 320 are set to zero.

Figure 7:
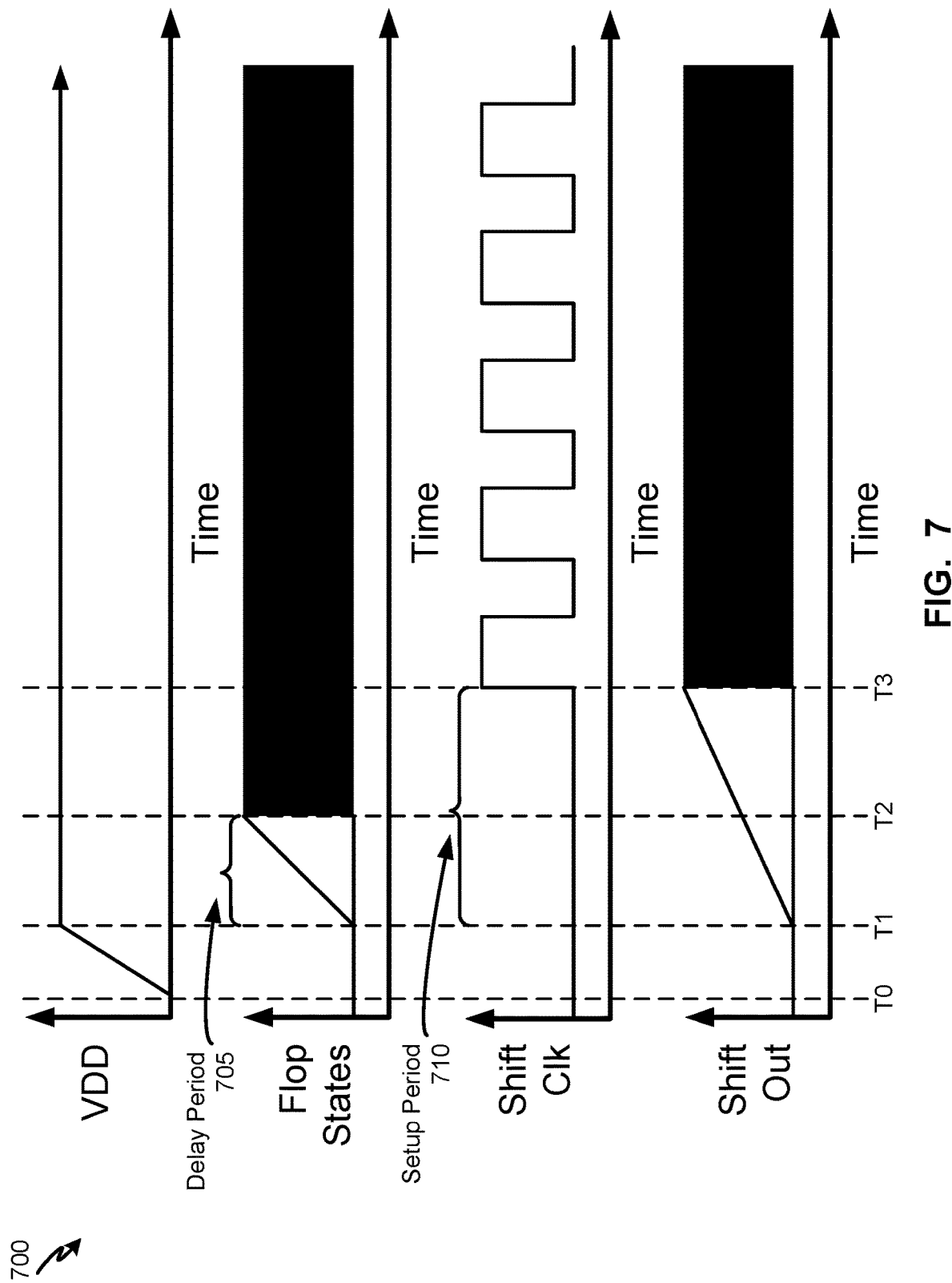
FIG. 7 illustrates an example sensing sequence, according to an example implementation of the present subject matter.

FIG. 7 illustrates a sensing sequence 700 with respect to power, memory stabilization, clock signals and shift out signals over time. At time T0, a power-on signal is received at the sensing die 315. For example, the electrical interface 150 may provide power to the sensing die 315 via the voltage supply line 530 in response to a fluid level measurement request. At time T1, the voltage across the sensing die 315 stabilizes (e.g., is set to a high value) and the sensing flops 320 start storing fluid level values. In the illustrated sequence 700, a delay period 705 occurs between time T1 when the voltage stabilizes and time T2 when the fluid level values are stabilized in the memories 615, 635 of the sensing flops 320. At time T2, the fluid level values are stabilized in the sensing flops 320.

At time T3, the electrical interface 150 sends a shift signal via the clock 535 to the shift register 515 and the sensing flops 320 initiate the "shift out" process to transmit the fluid level values to the electrical interface 150. In the illustrated sequence 700, a setup period 710 occurs between time T1, when the sensing flops 320 begin latching fluid level values and time T3, when the shift signal is transmitted. The duration of the setup period 710 is selected to ensure that the sensing flops 320 are stable before the fluid level values are transmitted to the electrical interface 150. The duration of the setup period 710 may be determined based on empirical testing and/or simulated testing. In some example implementations, the electrical interface 150 may initiate a setup period timer at time T1 to correspond to the setup period 710. In the illustrated sequence 700, the shift clock signal 535 is a periodic signal and the "shift out" process is triggered on the rising-edge of the shift clock signal 535. In an example implementation, the shift clock signal 535 continues until all of the fluid level values are transmitted to the electrical interface 150. The electrical interface 150 may then power-down the shift register 515.

Although not shown in the illustrated sequence 700, a propagation delay may occur between when the shift clock signal is received at a sensing flop 320 at time T3 and when the sensing flop 320 "shifts out" its output value 645 to the next sensing flop 320 in the shift register 515 via the data signal line 620 or to the electrical interface 150 via the sensing line 545.

While an example manner of implementing the printing system 100 is illustrated in FIGS. 1-5 and/or 6, in some examples, at least one of the elements, processes and/or devices illustrated in FIGS. 1-5 and/or 6 may be combined, divided, re-arranged, omitted, eliminated and/or implemented in any other way. Further, the example print head 115, the example controller 125, the example memory 130, the example memory 145, the example electrical interface 150, the example print head 405 and/or, more generally, the example printing system 100 of FIGS. 1-5 and/or 6 may be implemented by hardware, software, firmware and/or any combination of hardware, software and/or firmware. Thus, for example, any of the example print head 115, the example controller 125, the example memory 130, the example memory 145, the example electrical interface 150, the example print head 405 and/or, more generally, the example printing system 100 of FIGS. 1-5 and/or 6 could be implemented by a circuit(s), a programmable processor(s), an application specific integrated circuit(s) (ASIC(s)), a programmable logic device(s) (PLD(s)) and/or a field programmable logic device(s) (FPLD(s)), etc.

When reading any of the apparatus or system claims of this patent to cover a purely software and/or firmware implementation, at least one of the example print head 115, the example controller 125, the example memory 130, the example memory 145, the example electrical interface 150, the example print head 405 is hereby expressly defined to include a tangible computer readable storage device or storage disc such as a memory, DVD, CD, Blu-ray, etc. storing the software and/or firmware. Further still, the example printing system 100 of FIGS. 1-5 and/or 6 may include an element(s), process(es) and/or devices in addition to, or instead of, those illustrated and/or may include more than one of any or all of the illustrated elements, processes and devices.

Figure 8:
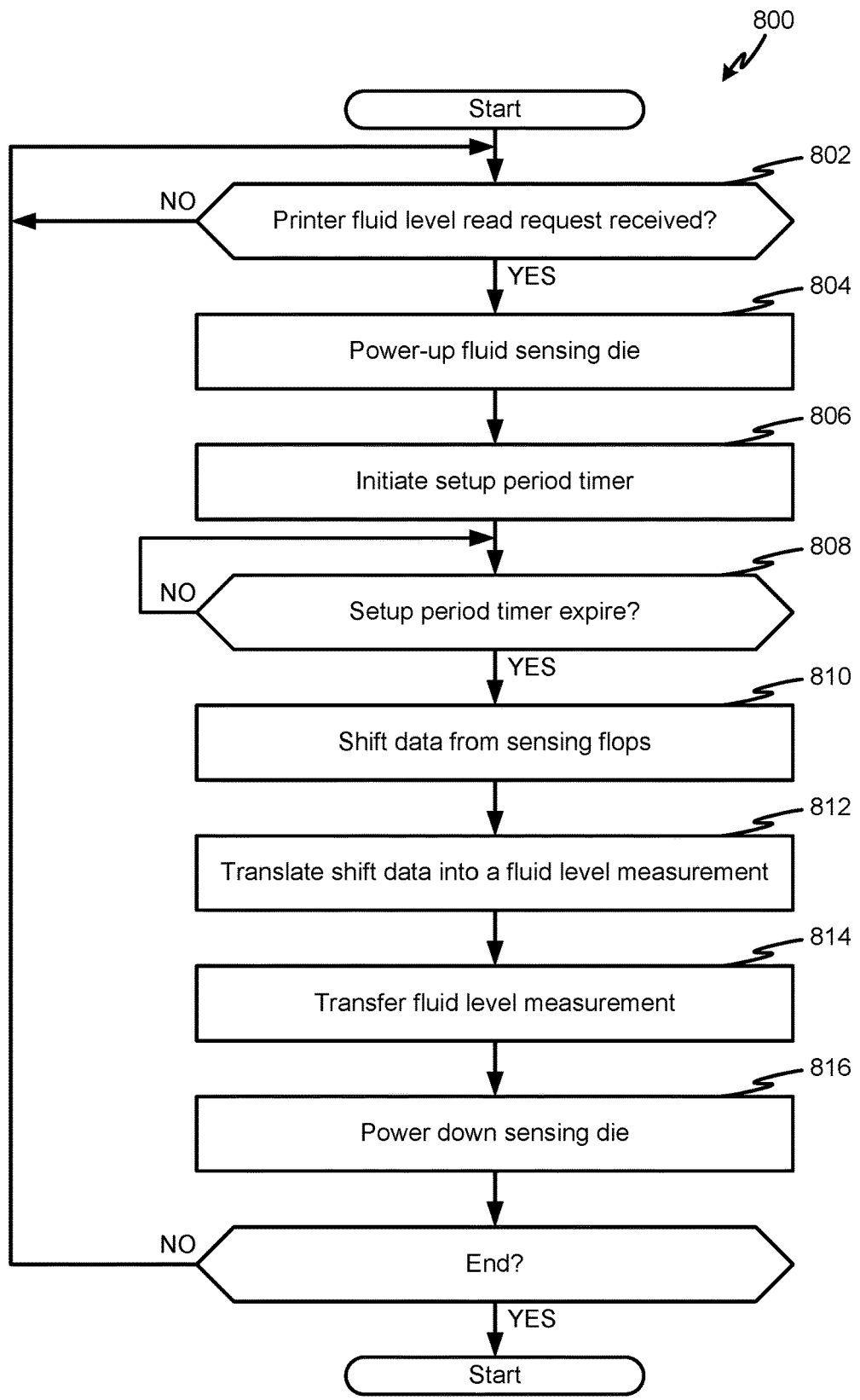
FIG. 8 is an example flowchart representative of example machine readable instructions that may be executed to implement the example fluid cartridges of FIGS. 1-5 and/or 6.

A flowchart representative of example machine readable instructions for implementing the printing system 100 of FIGS. 1-5 and/or 6 is shown in FIG. 8. In this example, the machine readable instructions comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example printing system 100 may alternatively be used. For example, the order of execution of the blocks may be changed, and/or some of the blocks described may be changed, eliminated, or combined.

As mentioned above, the example processes of FIG. 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program of FIG. 8 begins at block 802 by determining whether a fluid level read request was received. For example, the electrical interface 150 may receive a fluid level read request in response to a command from a user, in response to a page count, etc. At block 804, the program of FIG. 8 initiates power-up of the sensing die 315 by, for example, the electrical interface 150 providing power to the sensing die 315 via the voltage supply line 530. In response to the power provided by the voltage supply line 530, the sensing flops 320 begin to store fluid level values (e.g., a logical "1" value or a logical "0" value) representative of whether fluid was detected or was not detected in the fluid container 140.

At block 806, the program of FIG. 8 initiates a setup period. For example, the electrical interface 150 may initiate a timer. At block 808, the program of FIG. 8 determines whether or not the setup timer expired. If, at block 808, the program of FIG. 8 determined that the setup timer did not expire, then control returns to block 808.

If, at block 808, the program of FIG. 8 determined that the setup timer did expire, then, at block 810, the program of FIG. 8 "shifts out" the fluid level data stored in the sensing flops 320. For example, the electrical interface 150 may send a periodic shift clock signal to the sensing flops 320 via the clock signal 535. At block 812, the program of FIG. 8 translates (e.g., interprets) the fluid level values into a fluid level measurement. For example, the electrical interface 150 may map the number of fluid level values representative of contact with fluid in the fluid container 140 to a percentage (e.g., the electrical interface 150 may map twenty values indicative of contact with fluid to a fluid level measurement that the fluid container 140 is 40 percent filled). At block 814, the program of FIG. 8 transfers the fluid level measurement. For example, the electrical interface 150 may transmit the fluid level measurement to the controller 125, may store the fluid level measurement in the memory chip 145, etc. At block 816, the program of FIG. 8 powers-down the sensing die 315. For example, the electrical interface 150 may transition the voltage across the voltage supply line 530 to zero. At block 818, the program of FIG. 8 determines whether to continue making fluid level measurements. If, at block 818, the program of FIG. 8 determined to continue making fluid level measurements, control returns to block 802 to determine whether a fluid level read request was received. Otherwise, the example program of FIG. 8 ends.

Figure 9:
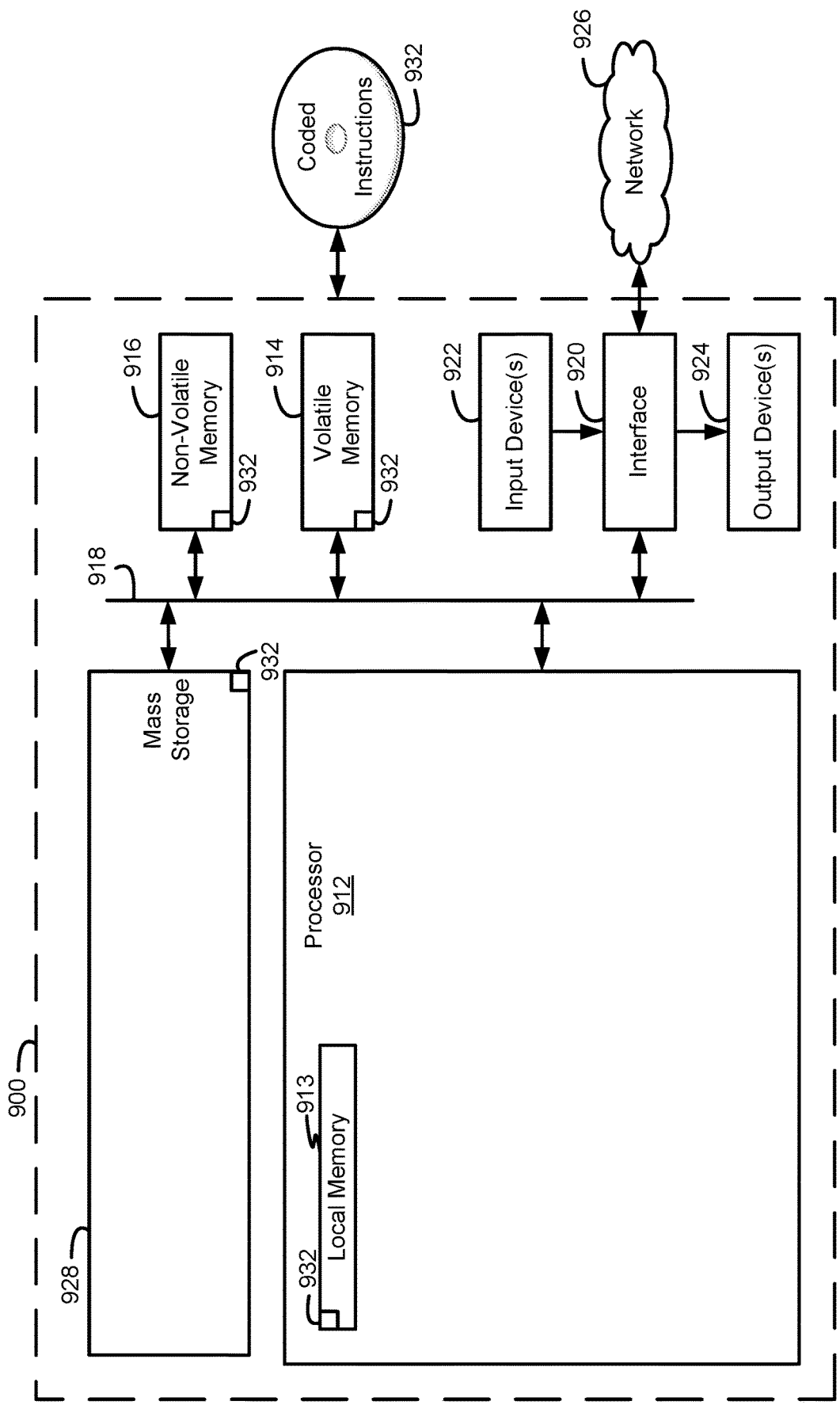
FIG. 9 is an example processor platform to execute the example instructions of FIG. 8 to implement the example fluid cartridges of FIGS. 1-5 and/or 6.

FIG. 9 is a block diagram of an example processor platform 900 capable of executing the instructions of FIG. 8 to implement the printing system 100 of FIGS. 1-5 and/or 6. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIG. 8 may be stored in the mass storage device 928, in the volatile memory 914, in the non-volatile memory 916, and/or on a removable tangible computer readable storage medium such as a CD or DVD.

In one example of this disclosure, a method for sensing fluid levels in a fluid container is provided, wherein the method includes: providing a voltage to a sensing die integrated with the fluid container, the sensing die to include a shift register to store fluid level information in response to the voltage; and mapping the fluid level information to a measurement. The method may further include initiating a timer when the voltage is provided to the sensing die; and in response to the timer expiring, applying a clock signal to the shift register. The method may further include facilitating a shift out of the fluid level information from the shift register by applying the clock signal to the shift register. Furthermore the fluid level information may include a plurality of values stored by corresponding sensing flops when the voltage is provided to the sensing die. Furthermore, each sensing flop may be associated with a position in the fluid container, and the value stored by the sensing flop corresponding to whether fluid was detected at the associated position.

From the foregoing, it will appreciate that the above disclosed methods, apparatus and articles of manufacture relate to printing cartridges and sensing fluid levels of the cartridges. Using the examples disclosed herein, fluid level information is stored in a series of sensing flops included in a shift register. The shift register is embedded in a sensing die that is integrated with a fluid container and that extends from the top of the fluid container to the bottom of the fluid container, or a portion of the fluid container. When power is received at the shift register, the sensing flops latch (e.g., store) a fluid level value representative of whether corresponding electrodes detected (e.g., were in contact with) fluid in the fluid container. The electrodes are electrically connected to the sensing flops. Based on whether an electrode detected fluid, the corresponding sensing flop stores a logical "0" value or a logical "1" value. After a setup period, the fluid level values are "shifted out" of the shift register and translated (e.g., mapped) to a fluid level measurement (e.g., 40 percent filled). The disclosed methods, apparatus and articles of manufacture save print head cost by providing a simple method for capturing and communicating fluid levels in a fluid container. Furthermore, the disclosed methods, apparatus and articles of manufacture provide a simple communication protocol that reduces silicon area and costs associated with embedding silicon.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Although implementations for fluid level sensing apparatus and methods have been described in language specific to structural features, it is to be understood that the present subject matter is not limited to the specific features described. Rather, the specific features are disclosed and explained as example implementations for fluid level sensing apparatus and methods.

I claim:

1. A printing cartridge comprising:
   a fluid container;
   a plurality of electrodes disposed in the fluid container to detect fluid in the fluid container; and
   a shift register to capture fluid level information from the plurality of electrodes, the shift register including a plurality of sensing flops, the sensing flops electrically coupled to the fluid container via corresponding electrodes of the plurality of electrodes.

2. The printing cartridge of claim 1, wherein the plurality of sensing flops store respective fluid level values when a voltage is provided to the shift register, the fluid level values representative of whether fluid is detected by the corresponding electrodes.

3. The printing cartridge of claim 1, wherein the fluid container includes an electrical ground to bias a signal received at a first sensing flop of the plurality of sensing flops to a first value when an electrode associated with the first sensing flop is in contact with fluid in the fluid container.

4. The printing cartridge of claim 1, further including an electrical interface to map the fluid level information to a fluid level measurement.

5. The printing cartridge of claim 4, wherein the electrical interface is to:

generate a signal based on the fluid level measurement; and transmit the signal to a printer.

6. The printing cartridge of claim 1, wherein the plurality of electrodes are positioned in the fluid container to correspond to a fluid level of the fluid container.

7. The printing cartridge of claim 1, wherein a first one of the plurality of sensing flops is connected to ground via the fluid in the fluid container when a corresponding first one of the plurality of electrodes is in contact with the fluid.

8. A sensing die comprising:
   a plurality of sensing flops; and
   a plurality of electrodes, each of the electrodes disposed in the fluid container at a respective position in the fluid container, respective ones of sensing flops electrically coupled to the fluid container via corresponding electrodes of the plurality of electrodes, the plurality of sensing flops to store a fluid level based on contact of the electrodes with fluid at the corresponding positions.

9. The sensing die of claim 8, wherein the plurality of sensing flops implement a serial-in and serial-out shift register.

10. The sensing die of claim 8, wherein a first sensing flop of the plurality of sensing flops includes:
    a first latch to store a first fluid level value at a position associated with the first sensing flop;
    a second latch to store a second fluid level value associated with a second sensing flop of the plurality of sensing flops.

11. The sensing die of claim 10, wherein the first latch is to shift out the first fluid level value and the first latch is to store the second fluid value.

12. The sensing die of claim 8, wherein the sensing flops store the respective fluid level values in response to a voltage applied to the sensing die.

13. A printing cartridge comprising
    a fluid container;
    a first electrode disposed in the fluid container at a first position;
    a second electrode disposed in the fluid container at a second position spaced apart from the first electrode;
    a first sensing flop electrically coupled to the fluid container via the first electrode, the first sensing flop including a first latch to store a first value representative of whether fluid was detected by the first electrode at the first position; and
    a second sensing flop electrically coupled to the fluid container via the second electrode, the second sensing flop including a second latch to store a second value representative of whether fluid was detected by the second electrode at the second position, the first and second values based on a signal.

14. The apparatus of claim 13, wherein the fluid container includes an electrical ground to bias the values when the first electrode or the second electrode is in contact with fluid in the fluid container.

15. The apparatus of claim 13, wherein the first latch is electrically connected to a first capacitor, the first capacitor to bias the first value stored in the first latch when the first electrode is not in contact with fluid in the fluid container.

* * * * *